US012269178B2

(12) United States Patent
Xu

(10) Patent No.: US 12,269,178 B2
(45) Date of Patent: Apr. 8, 2025

(54) ROBOT, METHOD OF CAPTURE IMAGE, ELECTRONIC DEVICE, AND COMPUTER-READABLE STORAGE MEDIUM

(71) Applicant: Jingdong Technology Information Technology Co., Ltd., Beijing (CN)

(72) Inventor: Zhetao Xu, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 245 days.

(21) Appl. No.: 17/784,429

(22) PCT Filed: Dec. 10, 2020

(86) PCT No.: PCT/CN2020/135259
§ 371 (c)(1),
(2) Date: Jun. 10, 2022

(87) PCT Pub. No.: WO2021/129406
PCT Pub. Date: Jul. 1, 2021

(65) Prior Publication Data
US 2023/0001584 A1    Jan. 5, 2023

(30) Foreign Application Priority Data

Dec. 26, 2019  (CN) .......................... 201911373770.X

(51) Int. Cl.
*B25J 9/10*   (2006.01)
*B25J 9/12*   (2006.01)
(Continued)

(52) U.S. Cl.
CPC ............. *B25J 9/1697* (2013.01); *B25J 9/102* (2013.01); *B25J 9/123* (2013.01); *B25J 9/1664* (2013.01); *B25J 18/025* (2013.01)

(58) Field of Classification Search
CPC ........ B25J 9/1664; B25J 5/007; B25J 18/025; B25J 11/008; B25J 9/162; B25J 9/1697;
(Continued)

(56) References Cited

U.S. PATENT DOCUMENTS

| 5,937,699 A | 8/1999 | Garrec |
| 9,031,696 B2 | 5/2015 | Nakahara |

(Continued)

FOREIGN PATENT DOCUMENTS

| CN | 102729253 | 10/2012 |
| CN | 104079811 | 10/2014 |

(Continued)

OTHER PUBLICATIONS

Extended European Search Report, issued in the corresponding European patent application No. 20907062.2, dated Jan. 5, 2024, 9 pages.

(Continued)

*Primary Examiner* — Stephen Holwerda
(74) *Attorney, Agent, or Firm* — HSML P.C.

(57) ABSTRACT

A robot and a method of capturing an image applied to the robot, an electronic device for implementing the method of capturing the image, and a computer-readable storage medium are provided. The robot includes: a robot body; a workbench; a telescopic structure having one end pivotally connected to the robot body and the other end connected to the workbench; a driving mechanism arranged on the robot body and configured to drive the telescopic structure to extend, retract and/or move relative to the robot body; and an image capture device arranged on the workbench. The telescopic structure is configured to allow the image capture device to capture an image of a target object from different angles with the extension, retraction and/or movement of the telescopic structure.

14 Claims, 5 Drawing Sheets

(51) Int. Cl.
*B25J 9/16* (2006.01)
*B25J 18/02* (2006.01)

(58) Field of Classification Search
CPC .......... B25J 19/023; B25J 9/123; B25J 9/102; G05B 2219/40411
See application file for complete search history.

(56) References Cited

U.S. PATENT DOCUMENTS

| | | | |
|---|---|---|---|
| 10,849,709 | B2 | 12/2020 | Meglan |
| 2008/0181485 | A1* | 7/2008 | Beis ................. B25J 9/1697 382/209 |
| 2012/0265345 | A1 | 10/2012 | Nakahara |
| 2017/0239822 | A1* | 8/2017 | Sakata .................. H02J 50/10 |
| 2017/0244284 | A1* | 8/2017 | Takahashi ............. H02J 50/12 |
| 2018/0224825 | A1* | 8/2018 | Tamai .................. G05B 19/402 |
| 2018/0241938 | A1 | 8/2018 | Buibas et al. |
| 2019/0053872 | A1 | 2/2019 | Meglan |
| 2019/0094017 | A1* | 3/2019 | Wakabayashi ......... B25J 9/1697 |
| 2021/0077220 | A1 | 3/2021 | Meglan |
| 2021/0334599 | A1* | 10/2021 | Pirk ..................... G06V 10/776 |

FOREIGN PATENT DOCUMENTS

| | | |
|---|---|---|
| CN | 108366229 | 8/2018 |
| CN | 108778180 | 11/2018 |
| CN | 109176456 | 1/2019 |
| CN | 109291946 | 2/2019 |
| CN | 109382833 | 2/2019 |
| CN | 109531533 | 3/2019 |
| CN | 209063080 | 7/2019 |
| CN | 209142126 | 7/2019 |
| CN | 110328649 | 10/2019 |
| CN | 110421577 | 11/2019 |
| CN | 111002287 | 4/2020 |
| EP | 0729399 | 5/1998 |
| EP | 3567340 | 11/2019 |
| FR | 2822097 | 9/2002 |
| JP | 04-42714 | 2/1992 |
| JP | 07-30929 | 1/1995 |
| JP | 8103139 | 4/1996 |
| WO | 96/07513 | 3/1996 |

OTHER PUBLICATIONS

International Search Report, issued in the corresponding PCT Application No. PCT/CN2020/135259, dated Feb. 25, 2021, 8 pages.
First Office Action, issued in the corresponding Chinese application No. 201911373770.X, dated Oct. 10, 2020 15 pages (including translation).
Second Office Action, issued in the corresponding Chinese application No. 201911373770.X, dated Mar. 11, 2021, 16 pages (including translation).
Third Office Action, issued in the corresponding Chinese application No. 201911373770.X, dated Jun. 15, 2021, 15 pages (including translation).

* cited by examiner

ROBOT, METHOD OF CAPTURE IMAGE, ELECTRONIC DEVICE, AND COMPUTER-READABLE STORAGE MEDIUM

CROSS-REFERENCE TO RELATED APPLICATION

This application corresponds to PCT Application No. PCT/CN2020/135259, which claims priority to the Chinese Patent Application No. 201911373770.X, entitled "ROBOT, METHOD OF CAPTURING IMAGE, ELECTRONIC DEVICE, AND COMPUTER-READABLE STORAGE MEDIUM" and tiled on Dec. 26, 2019, the content of which are incorporated herein by reference in its entirety.

TECHNICAL FIELD

The present disclosure relates to a field of a computer technology, in particular to a robot, a method of capturing an image, an electronic device, and a computer-readable storage medium.

BACKGROUND

A development of the Internet has promoted a construction of machine room of IDC (Internet Data Center). With a large-scale and standardized construction of the IDC machine room, a machine room inspection robot is gradually applied to the IDC machine room to perform a repetitive inspection task of machine room cabinet. A main job of the machine room inspection robot during an inspection is to identify whether a computer device in the cabinet is operating normally. In a related art, the machine room inspection robot may take a photo of an indicator light indicating a running state of the computer device by using a camera and then perform an image recognition on the photo, so as to determine whether the computer device is running normally.

In a process of achieving a concept of the present disclosure, the inventors found that at least the following problems exist in the related art. In some machine rooms, a metal door with mesh holes may be installed on the cabinet due to a requirement of construction specifications. A non-mesh part of the metal door, for example, may block a running state indicator light, and an image for the running state indicator light may be missing from the photo taken by the camera, so that it is difficult to accurately determine whether the computer is running normally according to the photo taken.

SUMMARY

In view of this, embodiments of the present disclosure provide a robot, a method of capturing an, an electronic device, and a computer-readable storage medium.

An aspect of the embodiments of the present disclosure provide a robot, including: a robot body; a workbench; a telescopic structure having one end pivotally connected to the robot body and the other end connected to the workbench; a driving mechanism arranged on the robot body and configured to drive the telescopic structure to extend, retract and/or move relative to the robot body; and an image capture device arranged on the workbench. The telescopic structure is configured to allow the image capture device to capture an image of a target object from different angles with an extension, retraction and/or movement of the telescopic structure.

According to the embodiments of the present disclosure, the telescopic structure includes a gear and a telescopic, component arranged on the gear, the robot body is provided with a guide groove with serrations used in cooperation with the gear, and the driving mechanism is configured to drive the telescopic component to move vertically relative to the robot body by driving the gear to move vertically in the guide groove.

According to the embodiments of the present disclosure, the telescopic structure includes a sliding component and a telescopic component arranged on the sliding component, the robot body is provided with a sliding groove used in cooperation with the sliding component, and the driving mechanism is configured to drive the telescopic component to move vertically relative to the robot body by driving the sliding component to slide vertically in the sliding groove.

According to the embodiments of the present disclosure, the sliding component includes a limiting structure. The telescopic component includes: a nut arranged within the limiting structure; and a screw used in cooperation with the nut. The driving mechanism is configured to drive the screw to extend from the robot body or retract into the robot body by driving the nut to rotate in the limiting structure.

According to the embodiments of the present disclosure, the robot further includes: a light filling device arranged on the workbench and configured to fill light into a surrounding environment of the target object when capturing the image using the image capture device.

According to the embodiments of the present disclosure, the robot further includes: an image processing device configured to process a plurality of images to obtain an unobstructed image of the target object, wherein the plurality of images are captured by the image capture device for the target object from a plurality of angles.

Another aspect of the embodiments of the present disclosure provides a method of capturing an image applied to a robot, the robot includes: a robot body; a workbench; a telescopic structure having one end pivotally connected to the robot body and the other end connected to the workbench; a driving mechanism arranged on the robot body; and an image capture device arranged on the workbench. The method includes: driving, by using the driving mechanism, the telescopic structure to extend, retract and/or move relative to the robot body; capturing an image of a target object to obtain a first image by using the image capture device, in response to the image capture device reaching, a first position with an extension, retraction and/or movement of the telescopic structure; and capturing an image of the target object to obtain a second image by using the image capture device, in response to the image capture device reaching a second position with the extension, retraction and/or movement of the telescopic structure, wherein an unobstructed image of the target object is obtained by processing the first image and the second image.

According to the embodiments of the present disclosure, the first position and the second position are located on the same horizontal plane; or the first position and the second position are located on the same vertical plane.

According to the embodiments of the present disclosure, the robot further includes a light filling device. The method further includes: before capturing an image of the target object to obtain the first image by using the image capture device and/or capturing an image of the target object to obtain the second image by using the image capture device, filling light into a surrounding environment of the target object by using the light filling device.

Another aspect of the present disclosure of the embodiments of the present disclosure provides an electronic device, including: an electronic device body; a workbench; a telescopic structure having one end pivotally connected to the electronic device body and the other end connected to the workbench; a driving mechanism arranged on the electronic device body; an image capture device arranged on the workbench; one or more processors; and a storage device for storing, executable instructions, wherein the executable instructions, when executed by the one or more processors, are allowed to implement the method of the embodiments of the present disclosure.

Another aspect of the embodiments of the present disclosure provide a computer-readable storage medium having executable instructions stored thereon, wherein the executable instructions, when executed by a processor, are allowed to implement the method of the embodiments of the present disclosure.

Another aspect of the embodiments of the present disclosure provides a computer program containing, computer-executable instructions, wherein the computer-executable instructions, when executed, are allowed to implement the method of the embodiments of the present disclosure.

The embodiments of the present disclosure may be implemented to capture images of the target object respectively from a plurality of angles. Therefore, even in a case that a partial region of the target object is blocked by an occluder; a complete image of the target object may be obtained by, for example, stitching images captured from a plurality of angles.

BRIEF DESCRIPTION OF THE DRAWINGS

The above and other objectives, features and advantages of the present disclosure will be more apparent through the following description of embodiments of the present disclosure with reference to the accompanying drawings, in which.

DETAILED DESCRIPTION OF EMBODIMENTS

Figure 1:
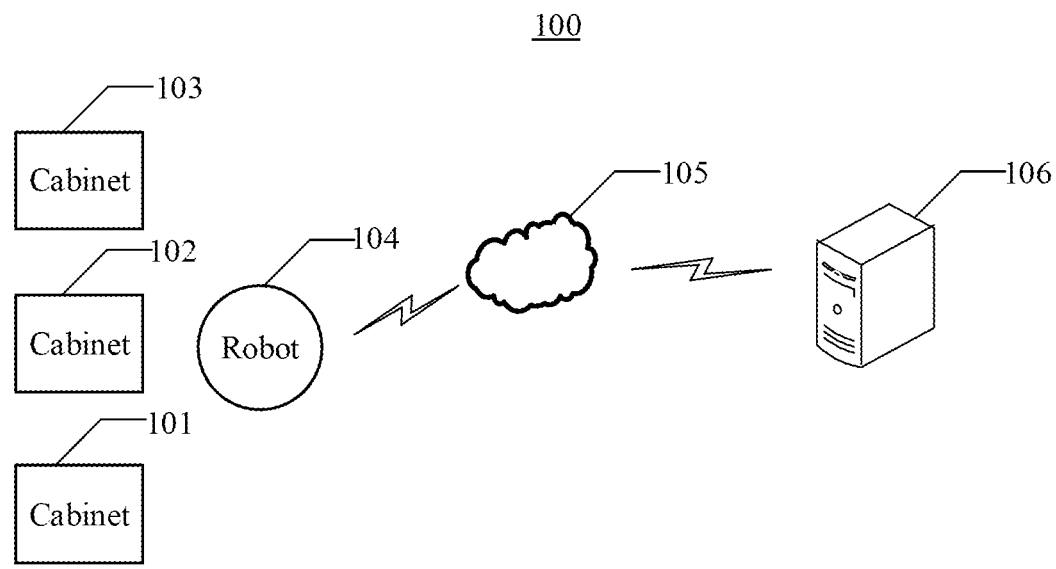
FIG. 1 schematically shows an application scenario of a robot according to an embodiment of the present disclosure.

Embodiments of the present disclosure will be described below with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "including", "containing", and the like used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In a case of using the expression similar to "at least one of A, B and C", it should be explained according to the meaning of the expression generally understood by those skilled in the art (for example, "a system including at least one of A, B and C" should include but not be limited to a system including only A, a system including only B, a system including only C, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A. B or C" should include but not be limited to a system including only A, a system including only B, a system including only C, a system including A and B, a system including A and C, a system including B and C, and/or a system including A, B and C). Those skilled in the art should also understand that any adversative conjunction and/or phrase connecting two or more optional items, whether in the description, claims or drawings, should be understood to give a possibility of including one of these items, any one of these items, or two items. For example, the phrase "A or B" should be understood to include a possibility of "A" or "B" of "A and B".

The terms "first" and "second" are only used for descriptive purposes, and should not be construed as indicating or implying relative importance or implicitly indicating the number of technical features indicated. Thus, a feature defined with "first", "second" may expressly or implicitly include one or more features.

The embodiments of the present disclosure provide a robot. The robot may include, for example, a robot body, a workbench, a telescopic structure having one end pivotally connected to the robot body and the other end connected to the workbench, a driving mechanism arranged on the robot body and used to drive the telescopic structure to extend, retract and/or move relative to the robot body, and an image capture device arranged on the workbench. The telescopic structure is configured to allow the image capture device to capture an image of a target object from different angles with an extension, retraction and/or movement of the telescopic structure.

FIG. 1 schematically shows an application scenario 100 of a robot according to an embodiment of the present disclosure. It should be noted that FIG. 1 is only an example of the application scenario to which the robot of the embodiments of the present disclosure may be applied, so as to help those skilled in the art to understand the technical content of the present disclosure, but it does not mean that the embodiments of the present disclosure may not be used to other devices, systems, environments or scenarios.

As shown in FIG. 1, the application scenario 100 according to this embodiment may include cabinets 101, 102 and 103, a robot 104, a network 105, and a server 106. The network 105 is used to provide a medium of a communication link between the robot 104 and the server 106. The network 105 may include various connection types, such as wired, wireless communication links, or fiber optic cables, etc.

The cabinets 101, 102 and 103 may be metal cabinets for accommodating an electrical or electronic device. The cabinets 101, 102 and 103 are generally provided with a door with a hole or/and gap, removable or non-removable side panel and back panel. In terms of types, the cabinets 101, 102 and 103 may include a computer cabinet, a server cabinet, a network cabinet, a console cabinet, a power cabinet and a monitoring cabinet, etc. The cabinets 101, 102 and 103 may be applied to a central machine room, a data machine room, a computer room, a control center, a monitoring room, a monitoring center and other places.

The robot 104 may interact with the server 106 through the network 105 to receive or send messages and the like. Various devices, such as a camera, a video camera, an LED light, a hygrometer, a lift mechanism, a mechanical arm, a pickup, a speaker and an alarm, etc. may be mounted on the robot 104.

The robot 104 may be various robots with a function of walking and navigation, including but not limited to an operating robot, a program robot, a teaching and reproducing robot, an intelligent robot, and an integrated robot. The robot 104 may walk to a specific position to perform a related operation on the cabinets 101, 102 and 103, for example, acquire an image information of the cabinets 101, 102 and 103.

The server 106 may be a server that provides various services, such as an analysis and storage server that analyzes and stores the information acquired by the robot 104. The analysis and storage server may analyze and process data such as image, temperature and voice acquired by the robot 104, and feedback a processing result to the robot 104, so that the robot 104 may perform a subsequent operation.

It should be understood that the number of cabinet, robot, network and server in FIG. 1 are merely illustrative. Any number of cabinet, robot, network and server may be provided according to an implementation need.

Figure 2:
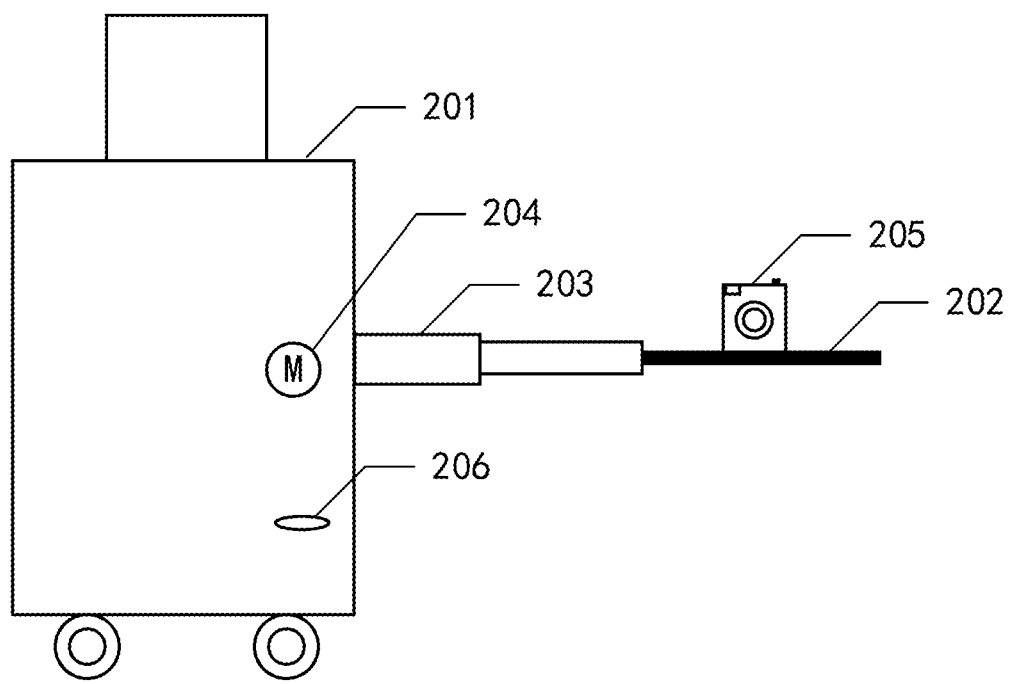
FIG. 2 schematically shows a structural diagram of a robot according to an embodiment of the present disclosure.

FIG. 2 schematically shows a structural diagram of a robot according to an embodiment of the present disclosure.

As shown in FIG. 2, as an optional embodiment, the robot may include a robot body 201, a workbench 202, a telescopic structure 203, a driving mechanism 204 and an image capture device 205.

Optionally, the telescopic structure 203 has one end pivotally connected to the robot body 201 and the other end connected to the workbench 202.

In the embodiments of the present disclosure, the robot body 201 may be a robot for machine room inspection with functions of walking, navigation and positioning. The robot body 201 may be equipped with an image capture system, a voice system, a temperature capture device, a humidity capture device, an information transceiver device, a data processing device, a data storage device, and the like.

In the embodiments of the present disclosure, a fixed end of the telescopic structure 203 is connected to the robot body 201, and a free end of the telescopic structure 203 is connected to the workbench 202. One end of the telescopic structure 203 being pivotably connected to the robot body 201 means that the free end of the telescopic structure 203 may move vertically or/and horizontally relative to the robot body 201 so that the free end of the telescopic structure 203 may move the workbench 202 to a target position. The vertical movement may be a movement of the telescopic structure 203 in a vertical direction, and the horizontal movement may be a movement of the telescopic structure 203 on a plane perpendicular to the vertical direction.

In the embodiments of the present disclosure, the workbench 202 may specifically carry an image capture device, a lighting device, a temperature capture device and a humidity capture device, etc. The workbench 202 may also move relative to the robot body 201 under the driving, of the telescopic structure 203 so that the device carried on the workbench 202 may be moved to a specific position for a related operation.

In the embodiments of the present disclosure, the telescopic, structure 203 may include a mechanical arm, a robot hand, a telescopic rod and a sliding rail, etc. The flee end of the telescopic structure 203 is connected to the workbench 202, and the telescopic structure 203 may move the workbench 202 to a specific position so that the device carried on the workbench 202 may perform the related operation.

Optionally, the driving mechanism 204 is arranged on the robot body 201, and the driving mechanism 204 is used to drive the telescopic structure 203 to extend, retract and/or move relative to the robot body 201.

In the embodiments of the present disclosure, the driving mechanism 204 may include an electric motor, a hydraulic motor, and the like. The driving mechanism 204 may drive the telescopic structure 203 to move the workbench 202 to a specific position so that the device carried on the workbench 202 may perform a related operation at the specific position. A movement of the telescopic structure 203 relative to the robot body 201 includes a vertical movement and a horizontal movement.

Optionally, the image capture device 205 is arranged on the workbench 202. With an extension, retraction and/or movement of the telescopic structure 203, the image capture device 205 may capture images of the target object from different angles.

In the embodiments of the present disclosure, the image capture device 205 may include a camera, a video camera, a two-dimensional camera, a three-dimensional camera, and the like. The image capture device 205 has an auto-focus function, and in some scenarios, the camera of the image capture device 205 may be rotated so that an optical axis of the camera of the image capture device 205 passes through the target object, so as to better capture the image of the target object.

In the embodiments of the present disclosure, the workbench 202 may transport the image capture device 205 to different positions, so that the image capture device 205 may capture images of the target object at different positions. Since a partial region of the target object is blocked by an occluder (for example, blocked by a metal mesh), a single image of the target object captured by the image capture device 205 always contain a partial region blocked by the occluder. However, different regions are blocked by the occluder in the images of the target object captured at different positions. Therefore, a plurality of images of the target object captured by the image capture device 205 at different positions may reflect the whole target object more comprehensively.

In the embodiments of the present disclosure, the telescopic structure 203 may move the image capture device 205 to different positions, and the image capture device 205 may capture images of the target object at different positions. Since the position of the image capture device 205 changes, an angle of the image capture device 205 relative to the target object changes accordingly, that is, an angle at which the image capture device 205 captures the image of the target object changes, so that the image capture device 205 may capture images of the target object from a plurality of angles.

In the embodiments of the present disclosure, the robot may further include processor 206.

Specifically, the processor 206 may be connected to the driving mechanism 204.

Figure 6:
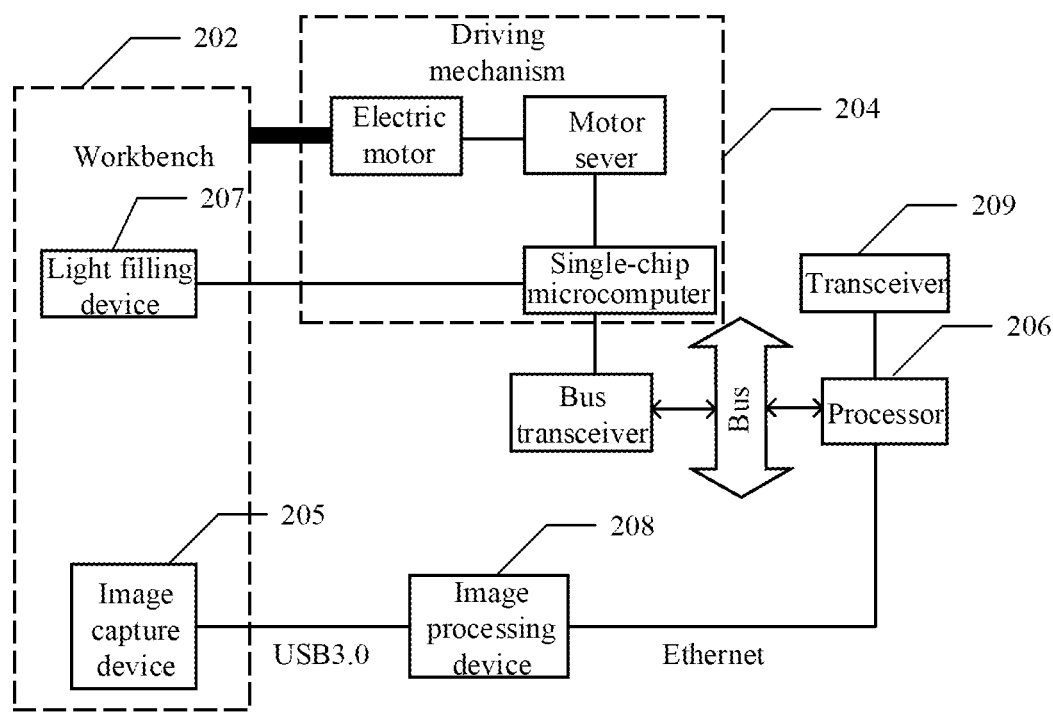
FIG. 6 schematically shows a block diagram of a robot according to an embodiment of the present disclosure.

In the embodiments of the present disclosure, the processor 206 may include a CPU (Central Processing Unit), a DSP (Digital Signal Processor), a microprocessor, and the like. The driving mechanism 204 may include a single-chip microcomputer, a motor server, and a motor. The single-chip microcomputer is connected to the motor server, the motor server is connected to the motor, and the single-chip microcomputer controls an operation of the motor through the motor server (for example, as shown in FIG. 6). The processor 206 is connected to the single-chip microcomputer of the driving mechanism 204, and the processor 206 may transmit an instruction to the single-chip microcomputer, so that the single-chip microcomputer may control the operation of the motor through the motor server.

In the embodiments of the present disclosure, the processor 206 is connected to a bus (e.g., a CAN bus), and the single-chip microcomputer is mounted to the bus through a bus transceiver (e.g., as shown in FIG. 6). In addition, the temperature capture device, the humidity capture device and other devices may be mounted to the bus to communicate with the processor 206. A user may mount a required device to the bus according to a specific need, which may greatly improve a scalability of the robot.

Specifically, the processor 206 may be connected to the image capture device 205.

In the embodiments of the present disclosure, the processor 206 may transmit an instruction to the image capture device 205 to control the image capture device 205 to capture an image of the target object. For example, the processor 206 may control the image capture device 205 to capture an image of the target object when the workbench 202 moves to a position, and the processor 206 may control the image capture device 205 to capture another image of the target object when the workbench 202 moves to another position.

In the embodiments of the present disclosure, the image capture device 205 may be moved to different positions by using the telescopic structure 203 to capture images of the target object, that is, may capture images of the target object from different angles. If the images captured from different angles are stitched or fused to obtain a stitched or fused image, the stitched or fused image may avoid an occlusion of the target object by an occluder, so that a more comprehensive image of the target object may be obtained.

The robot shown in FIG. 2 will be further described below with reference to FIG. 3 to FIG. 8 in conjunction with specific embodiments.

Figure 3:
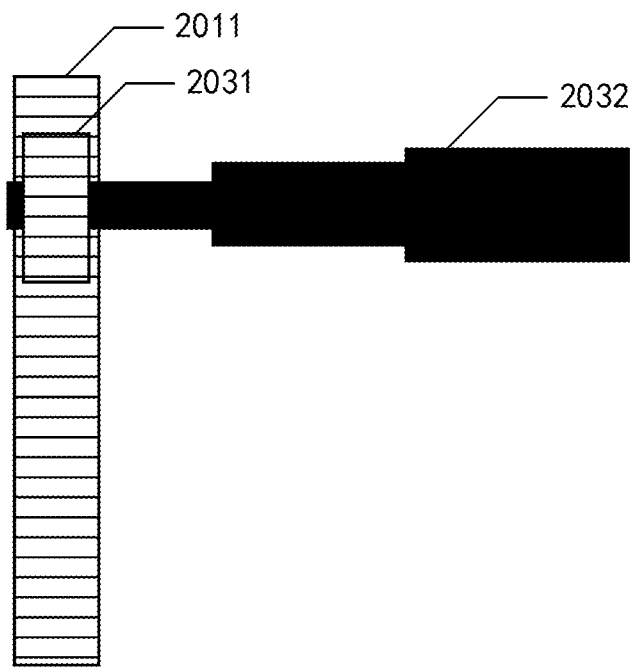
FIG. 3 schematically shows a structural diagram of a telescopic structure according to an embodiment of the present disclosure.

FIG. 3 schematically shows a structural diagram of a telescopic structure according to an embodiment of the present disclosure.

Specifically, as an optional embodiment, as shown in FIG. 3, the telescopic structure 203 may include a gear 2031 and a telescopic component 2032 arranged on the gear 2031.

Optionally, the robot body 201 is provided with a guide groove 2011 with serrations used in cooperation with the gear 2031. By driving the gear 2031 to move vertically in the guide groove, the driving mechanism 204 may drive the telescopic component 2032 to move vertically relative to the robot body.

In the embodiments of the present disclosure, the gear 2031 may be sleeved on a bearing, and the telescopic component 2032 may be provided on the bearing sleeved by the gear 2031, so that the telescopic component 2032 does not rotate with the gear 2031 but the gear 2031 may carry the telescopic component 2032 to move together. In addition, the serrations of the guide groove 2011 may mesh with the teeth of the gear 2031, so that the gear 2031 may move stably along the guide groove 2011.

Figure 4:
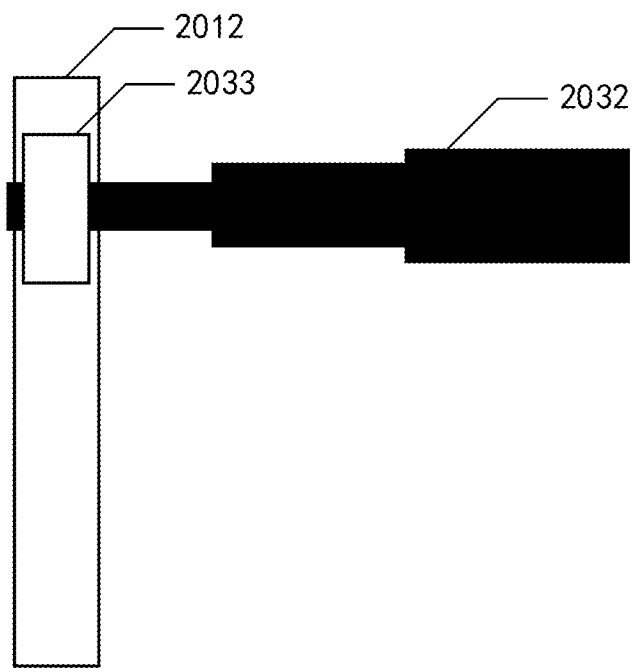
FIG. 4 schematically shows a structural diagram of a telescopic structure according to another embodiment of the present disclosure.

FIG. 4 schematically shows a structural diagram of a telescopic structure according to another embodiment of the present disclosure.

Specifically, as an optional embodiment, as shown in FIG. 4, the telescopic structure 203 may include a sliding component 2033 and a telescopic component 2032 arranged on the sliding component 2033.

Optionally, the robot body 201 is provided with a sliding groove 2012 used in cooperation with the sliding component 2033. By driving the sliding component 2033 to slide vertically in the sliding groove 2012, the driving mechanism 203 may drive the telescopic component 2032 to move vertically relative to the robot body 201.

In the embodiments of the present disclosure, the sliding component 2033 may include a slider, a sliding wheel, a rolling ball, and the like. The sliding groove 2012 may have a notch and a groove cavity. A cross-sectional area of the notch is slightly less than a cross-sectional area of the groove cavity, so that the slider, the sliding wheel and the rolling ball of the sliding component 2033 may move in the groove cavity without falling out of the notch.

Figure 5:
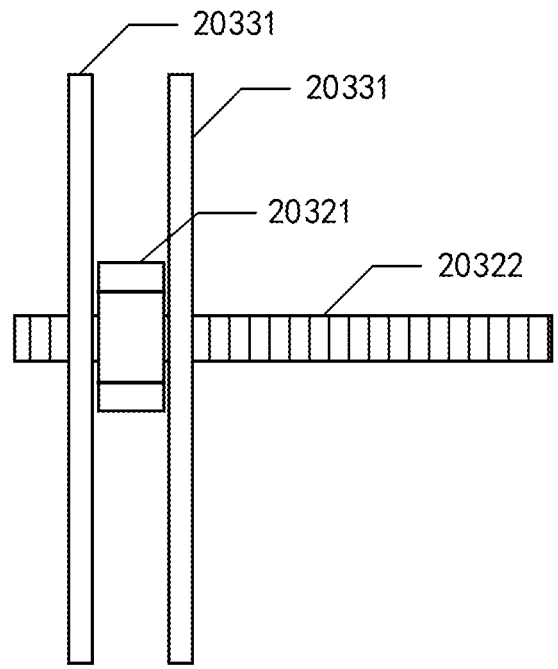
FIG. 5 schematically shows a structural diagram of a telescopic component according to an embodiment of the present disclosure.

FIG. 5 schematically shows a structural diagram of a telescopic component according to an embodiment of the present disclosure.

Specifically, as an optional embodiment, as shown in FIG. 5, the sliding component 2033 may include a limiting structure 20331, and the telescopic component 2032 may include a nut 20321 and a screw 20322.

Optionally, the nut 20321 is arranged in the limiting structure 20331, and the screw 20322 is used in cooperation with the nut 20321. By driving the nut 20321 to rotate in the limiting structure 20331, the driving mechanism 204 may drive the screw 20322 to extend from the robot body 201 or retract into the robot body 201, that is, the nut 20321 drives the screw 20322 to move horizontally, and the screw 20322 further drives the workbench 202 to move horizontally.

In the embodiment of the present disclosure, the nut 20321 may have an internal thread, the screw 20322 may have an external thread, and the internal thread of the nut 20321 matches the external thread of the screw 20322. In addition, the limiting structure 20331 may be two parallel plates fixed on the robot body 201, and the two parallel plates have corresponding holes. A diameter of the hole is greater than a diameter of the screw 20322 but less than an outer diameter of the nut 20321 (the outer diameter of the nut 20321 refers to a circumscribed circle of the nut 20321).

The nut 20321 is sandwiched between the two parallel plates, and the screw 20322 is screwed with the nut 20321 after passing through the holes in the parallel plates. Therefore, the nut 20321 may rotate but may not be displaced. With a forward rotation or a reverse rotation of the nut 20321, the screw 20322 may make a telescopic motion.

In the embodiment of the present disclosure, only a partial region of the screw 20322 may be provided with a thread. For a region without threads, a cross section perpendicular to an axial direction may be a polygon, such as a triangle, a square, and the like. If the cross section of one end of the screw 20322 connected to the workbench 202 is a square, the sliding component 2033 may further include a square sleeve that may be sleeved outside the end of the square screw 20322, so as to prevent the screw 20322 from rotating together with the nut 20321 when the nut 20321 rotates. In this way, the nut 20321 may drive the screw 20322 to stably make the telescopic motion.

FIG. 6 schematically shows a block diagram of a robot according to an embodiment of the present disclosure.

Specifically, as an optional embodiment, as shown in FIG. 6, the robot may further include a light filling device 207 and an image processing device 208.

Specifically, the light filling device 207 is provided on the workbench 202, and the light filling device 207 is used to fill light into a surrounding environment of the target object when the image is captured by the image capture device 205.

In the embodiment of the present disclosure, the light filling device 207 may include an LED light and an LED control circuit, and the LED light is connected to the LED control circuit. The LED control circuit may be connected to the single-chip microcomputer of the driving mechanism 204, and the single-chip microcomputer receives an instruction of the processor 206 to control a switch of the LED light through the LED control circuit. The LED control circuit may also be directly connected to the processor 206, and the LED control circuit receives an instruction from the processor 206 to control the switch of the LED light. Therefore, for a place with insufficient light, the light emitted by the LED light may fill the environment Where the target object is located, so that the image capture device 205 may capture a clear image.

The image processing device 208 is used to process a plurality of images captured by the image capture device 205 for the target object from a plurality of angles, so as to obtain an unobstructed image of the target object.

In the embodiment of the present disclosure, the image processing device 208 may be a GPU (graphics processing unit). The image processing device 208 may be arranged between the image capture device 205 and the processor 206, and the image processing device 208 may process the image of the target object captured by the image capture device 205. For example, the image processing device 208 may stitch or fuse images captured by the image capture device 205 at different positions, so as to form a complete image of the target object. In addition, an image processor 207 may transmit the stitched or fused image to the processor 206, and the processor 206 stores the stitched or fused image in a memory. For example, various image stitching and image fusion methods may be used to perform image stitching or image fusion operations, which are not limited by the embodiments of the present disclosure.

In the embodiment of the present disclosure, the image processing device 208 may receive image data from the image capture device 205 through USB3.0, and transmit the stitched or fused image to the processor 206 through Ethernet. Since the Ethernet has a large data transmission bandwidth, the stitched or fused image may be quickly transmitted to the processor 206.

In an embodiment of the present disclosure, the robot may further include a transceiver 209.

Specifically, the transceiver 209 may be connected to the processor 206. The transceiver 209 may be a transceiver antenna.

In the embodiment of the present disclosure, the processor 206 may transmit the stitched or fused image to the server through the transceiver 209, so that the server may store and analyze the stitched or fused image and then determine an operating state of the target object. For example, the stitched or fused image include a photo of an indicator light, a display screen, etc., and the server may determine the operating status of the target object according to a color of the indicator light and a content of the display screen.

Figure 7:
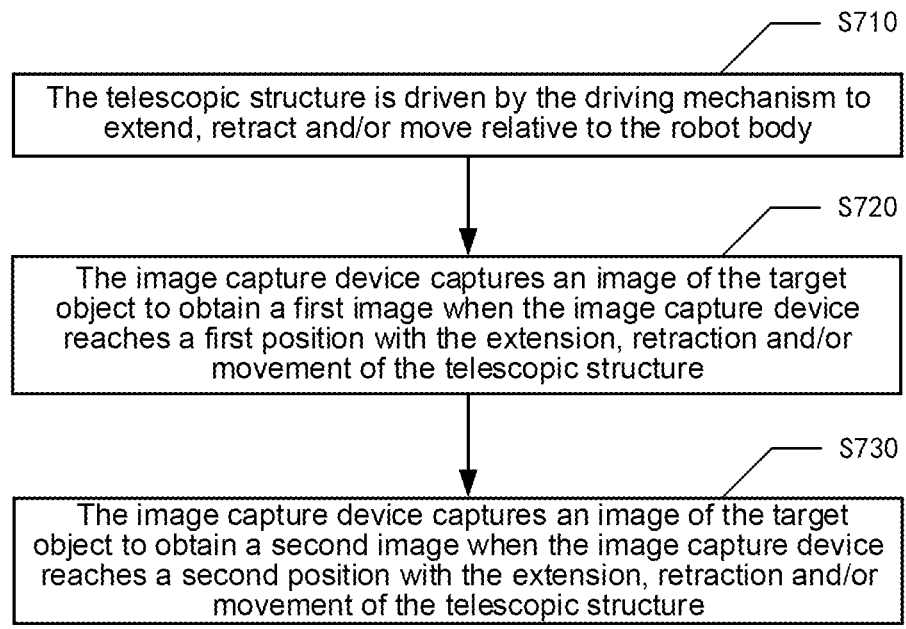
FIG. 7 schematically shows a flowchart of a method of capturing an image according to an embodiment of the present disclosure.

FIG. 7 schematically shows a flowchart of a method of capturing an image according to an embodiment of the present disclosure.

Optionally, the method shown in FIG. 7 may be implemented to capture an image of the target object by using the robot described in the above embodiments.

As an optional embodiment, the robot to which the method of capturing the image is applied may include a robot body, a workbench, a telescopic structure, a driving mechanism, and an image capture device.

Specifically, one end of the telescopic structure is pivotably connected to the robot body, and the other end of the telescopic structure is connected to the workbench; the driving mechanism is provided on the robot body; and the image capture device is provided on the workbench.

The method of capturing the image may include operations S710~S730.

In operation S710, the telescopic structure is driven by the driving mechanism to extend, retract and/or move relative to the robot body.

In the embodiment of the present disclosure, the telescopic structure may move vertically and/or horizontally relative to the robot body under the driving of the driving mechanism.

Next, in operation S720, the image capture device captures an image of the target object to obtain a first image when the image capture device reaches a first position with an extension, retraction and/or movement of the telescopic structure.

Then, in operation S730, the image capture device captures an image of the target object to obtain a second image when the image capture device reaches a second position with the extension, retraction and/or movement of the telescopic structure. An unobstructed image of the target object may be obtained by processing the first image and the second image.

In the embodiment of the present disclosure, the first position and the second position are located on the same horizontal plane; or the first position and the second position are located on the same vertical plane.

Figure 8:
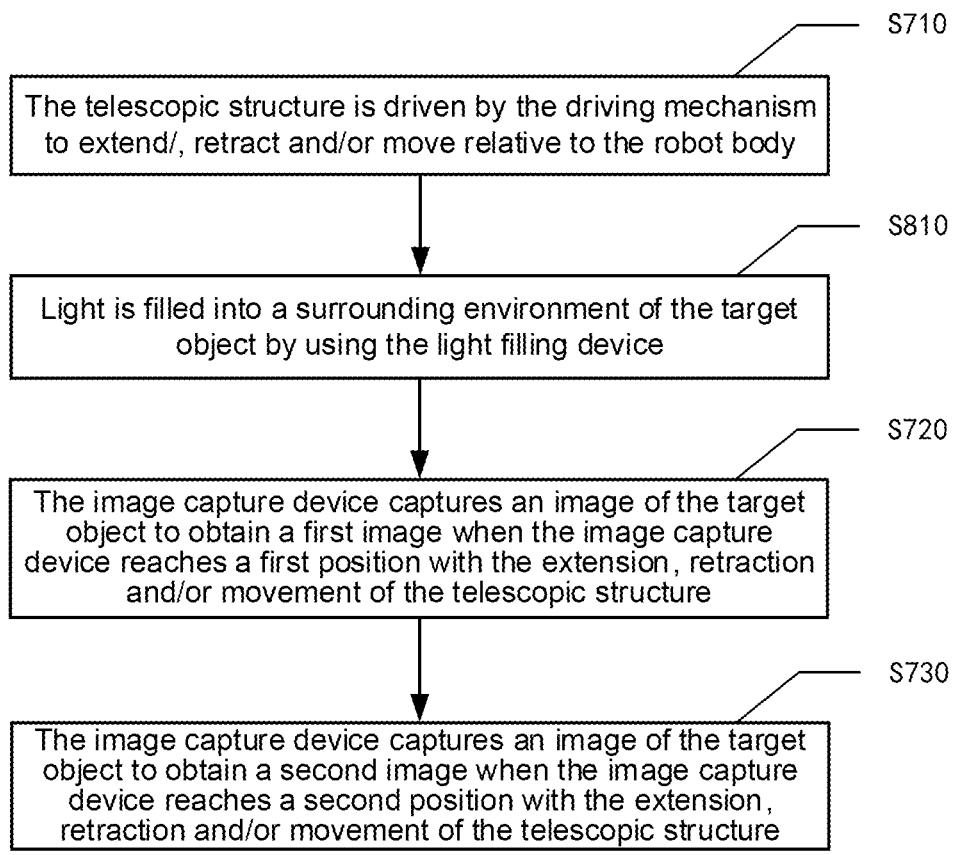
FIG. 8 schematically shows a flowchart of a method of capturing an image according to another embodiment of the present disclosure.

FIG. 8 schematically shows a flowchart of a method of capturing an image according to another embodiment of the present disclosure.

As an optional embodiment, as shown in FIG. 8, the robot to which the method of capturing, the image is applied may include a light filling device.

Specifically, the method of capturing the image may further include operation S810 before operation S720 or S730. For convenience of description, for example, the method includes operation S810 before operation S720.

In operation S810, light is filled into a surrounding environment of the target object by the light filling device.

In the embodiment of the present disclosure, when the environment of the target object is dim and the image capture device may not image clearly, light may be filled into the surrounding environment of the target object by the light filling device, so that the image capture device is in a good imaging environment.

Figure 9:
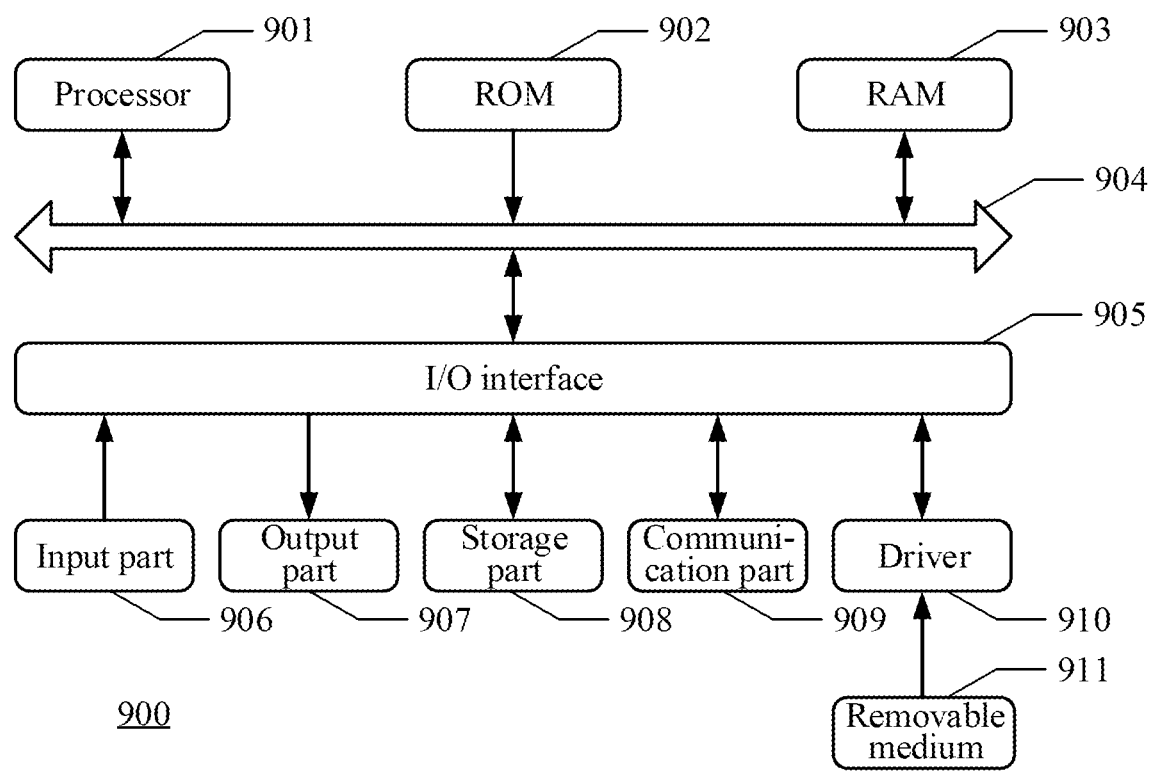
FIG. 9 schematically shows a block diagram of an electronic device suitable for implementing a method of capturing an image according to an embodiment of the present disclosure.

FIG. 9 schematically shows a block diagram of an electronic device suitable for implementing the method described above according to the embodiments of the present disclosure. The electronic device shown in FIG. 9 is merely an example, and should not bring any limitation to the function and scope of use of the embodiments of the present disclosure.

As shown in FIG. 9, an electronic device 900 according to the embodiments of the present disclosure includes a processor 901 that may execute various appropriate actions and processes according to a program stored in a read only memory (ROM) 902 or a program loaded from a storage part 908 into a random access memory (RAM) 903. The processor 901 may include, for example, a general-purpose microprocessor (for example, CPU), an instruction set processor and/or a related chipset and/or a special-purpose microprocessor (for example, an application specific integrated circuit (ASIC)), and the like. The processor 901 may further include an on-board memory for a caching purpose. The processor 901 may include a single processing unit or a plurality of processing units for executing different actions of the method flow according to the embodiments of the present disclosure.

Various programs and data required for an operation of the electronic device 900 are stored in the RAM 903. The processor 901, the ROM 902 and the RAM 903 are connected to each other through a bus 904. The processor 901 executes various operations of the method flow according to the embodiments of the present disclosure by executing the program in the ROM 902 and/or the RAM 903. It should be noted that the program may also be stored in one or more memories other than the ROM 902 and the RAM 903. The processor 901 may also execute various operations of the method flow according to the embodiments of the present disclosure by executing the program stored in the one or more memories.

According to the embodiments of the present disclosure, the electronic device 900 may further include an input/output (I/O) interface 905 that is also connected to the bus 904. The electronic device 900 may further include one or more of the following components connected to the interface 905: an input part 906 including a keyboard, a mouse, etc.; an output part 907 including a cathode ray tube (CRT), a liquid crystal display (LCD), etc. and a speaker, etc.; a storage part 908 including a hard disk, etc.; and a communication part 909 including a network interface card such as a LAN card, a modem, and the like. The communication part 909 performs communication processing via a network such as the Internet. A driver 910 is also connected to the I/O interface 905 as required. A removable medium 911, such as a magnetic disk, an optical disk, a magneto-optical disk, a semiconductor memory, etc. is installed on the driver 910 as required, so that the computer program read therefrom is installed into the storage part 908 as needed.

According to the embodiments of the present disclosure, the electronic device 900 may further include an electronic device body, a workbench, a telescopic structure, a driving mechanism, and an image capture device. One end of the telescopic structure is pivotally connected to the electronic device body, and the other end of the telescopic structure is connected to the workbench. The driving mechanism is arranged on the electronic device body, and the image capture device is arranged on the workbench. It should be noted that a function and a structure of the electronic device body are the same as or similar to those of the robot body in the above-mentioned embodiments. In addition, a function and a structure of the workbench, the telescopic structure, the driving mechanism and the image capture device correspond to those of the workbench, the telescopic, structure, the driving mechanism and the image capture device in the above-mentioned embodiments.

The method flow according to the embodiments of the present disclosure may be implemented as a computer software program. For example, the embodiments of the present disclosure include a computer program product containing a computer program carried on a computer-readable storage medium. The computer program contains a program code for execution of the method shown in the flowchart. In such an embodiment, the computer program may be downloaded and installed from the network through the communication part 909, and/or installed from the removable medium 911. When the computer program is executed by the processor 901, the above-mentioned functions defined in the electronic device of the embodiments of the present disclosure may be performed. According to the embodiments of the present disclosure, the above-described electronic device, device, apparatus, module, unit, etc. may be implemented by a computer program module.

The present disclosure further provides a computer-readable storage medium, which may be included in the device/apparatus/system described in the above embodiments; or exist alone without being assembled into the device/apparatus/system. The above-mentioned computer-readable storage medium may carry one or more programs that when executed, implement the method according to the embodiments of the present disclosure.

According to the embodiments of the present disclosure, the computer-readable storage medium may be a non-transitory computer-readable storage medium that, for example, may include but is not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to the embodiments of the present disclosure, the computer-readable storage medium may include the ROM 902 and/or the RAM 903 described above and/or one or more memories other than the ROM 902 and the RAM 903.

Those skilled in the art may understand that the various embodiments of the present disclosure and/or the features described in the claims may be combined in various ways, even if such combinations are not explicitly described in the present disclosure. In particular, the various embodiments of the present disclosure and/or the features described in the claims may be combined in various ways without departing from the spirit and teachings of the present disclosure. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A robot, comprising:
a robot body;
a workbench;
a telescopic structure having one end pivotally connected to the robot body and the other end connected to the workbench;
a driving mechanism arranged on the robot body and configured to drive the telescopic structure to extend, retract and/or move relative to the robot body;
an image capture device arranged on the workbench, wherein the image capture device is configured to capture, a plurality of images of a target object that is partially blocked, at different positions from different angles with an extension, a retraction and/or a movement of the telescopic structure; and
an image processing device that is configured to stitch or fuse the plurality of images to obtain an unobstructed image of the target object that is partially blocked, so as to determine an operating status of the target object,
wherein blocked regions of the target object are different from one another, in the plurality of images of the target object that is partially blocked captured at different positions from different angles.

2. The robot of claim 1, wherein,
the telescopic structure comprises a gear and a telescopic component arranged on the gear,
the robot body is provided with a guide groove with serrations used in cooperation with the gear, and
the driving mechanism is configured to drive the telescopic component to move vertically relative to the robot body by driving the gear to move vertically in the guide groove.

3. The robot of claim 1, wherein,
the telescopic structure comprises a sliding component and a telescopic component arranged on the sliding component,
the robot body is provided with a sliding groove used in cooperation with the sliding component, and
the driving mechanism is configured to drive the telescopic component to move vertically relative to the robot body by driving the sliding component to slide vertically in the sliding groove.

4. The robot of claim 3, wherein,
the sliding component comprises a limiting structure;
the telescopic component comprises:
a nut arranged within the limiting structure; and
a screw used in cooperation with the nut,
wherein the driving mechanism is configured to drive the screw to extend from the robot body or retract into the robot body by driving the nut to rotate in the limiting structure.

5. The robot of claim 1, further comprising:
a light filling device arranged on the workbench and configured to fill light into a surrounding environment of the target object that is partially blocked when capturing the image using the image capture device.

6. A method of capturing an image applied to a robot, wherein
the robot comprises:
a robot body;
a workbench;
a telescopic structure having one end pivotally connected to the robot body and the other end connected to the workbench;
a driving mechanism arranged on the robot body;
an image capture device arranged on the workbench, and
an image processing device, and
the method comprises:
driving, by using the driving mechanism, the telescopic structure to extend, retract and/or move relative to the robot body;
capturing an image of a target object that is partially blocked to obtain a first image by using the image capture device, in response to the image capture device reaching a first position with the extension, the retraction and/or the movement of the telescopic structure; and
capturing an image of the target object that is partially blocked to obtain a second image by using the image capture device, in response to the image capture device reaching a second position with the extension, the retraction and/or the movement of the telescopic structure,
wherein an unobstructed image of the target object that is partially blocked is obtained by stitching or fusing the first image and the second image, so as to determine an operating status of the target object,
wherein blocked regions of the target object are different from one another, in the plurality of images of the target object that is partially blocked captured at different positions from different angles.

7. The method of claim 6, wherein,
the first position and the second position are located on the same horizontal plane; or
the first position and the second position are located on the same vertical plane.

8. An electronic device, comprising:
an electronic device body;
a workbench;
a telescopic structure having one end pivotally connected to the electronic device body and the other end connected to the workbench;
a driving mechanism arranged on the electronic device body;
an image capture device arranged on the workbench;
an image processing device;
one or more processors; and
a storage device for storing executable instructions, wherein the executable instructions, when executed by the one or more processors, are allowed to implement the method of claim 7.

9. A non-transitory computer-readable storage medium having executable instructions stored thereon, wherein the executable instructions, when executed by a processor, are allowed to implement the method of claim 7.

10. The method of claim 6, wherein,
the robot further comprises a light filling device;
the method further comprises: before capturing an image of the target object that is partially blocked to obtain the first image by using the image capture device and/or capturing an image of the target object that is partially blocked to obtain the second image by using the image capture device, filling light into a surrounding environment of the target object that is partially blocked by using the light filling device.

11. An electronic device, comprising:
an electronic device body;
a workbench;
a telescopic structure having one end pivotally connected to the electronic device body and the other end connected to the workbench;
a driving mechanism arranged on the electronic device body;
an image capture device arranged on the workbench;
an image processing device;
one or more processors; and
a storage device for storing executable instructions, wherein the executable instructions, when executed by the one or more processors, are allowed to implement the method of claim 10.

12. A non-transitory computer-readable storage medium having executable instructions stored thereon, wherein the executable instructions, when executed by a processor, are allowed to implement the method of claim 10.

13. An electronic device, comprising:
an electronic device body;
a workbench;
a telescopic structure having one end pivotally connected to the electronic device body and the other end connected to the workbench;
a driving mechanism arranged on the electronic device body;
an image capture device arranged on the workbench;
an image processing device;
one or more processors; and
a storage device for storing executable instructions, wherein the executable instructions, when executed by the one or more processors, are allowed to implement the method of claim 6.

14. A non-transitory computer-readable storage medium having executable instructions stored thereon, wherein the executable instructions, when executed by a processor, are allowed to implement the method of claim 6.

* * * * *